US006998988B1

(12) United States Patent
Kalce

(10) Patent No.: US 6,998,988 B1
(45) Date of Patent: Feb. 14, 2006

(54) INFANT ALARM SYSTEM FOR AN AUTOMOBILE

(76) Inventor: Paul D. Kalce, 16 E. Pine St., Mahanoy City, PA (US) 17948

( * ) Notice: Subject to any disclaimer, the term of this patent is extended or adjusted under 35 U.S.C. 154(b) by 94 days.

(21) Appl. No.: 10/828,867

(22) Filed: Apr. 21, 2004

(51) Int. Cl.
*G08B 13/00* (2006.01)

(52) U.S. Cl. .............................. 340/573.1; 340/457.1; 340/686.1; 340/686.4

(58) Field of Classification Search ............ 340/573.1, 340/426.26, 457, 457.1, 686.1, 686.4
See application file for complete search history.

(56) References Cited

U.S. PATENT DOCUMENTS

| | | | | |
|---|---|---|---|---|
| 5,260,684 A * | 11/1993 | Metzmaker | 340/457.1 |
| 5,793,291 A | 8/1998 | Thornton | |
| 5,901,978 A | 5/1999 | Breed et al. | |
| 5,949,340 A | 9/1999 | Rossi | |
| 5,966,070 A | 10/1999 | Thornton | |
| 6,104,293 A | 8/2000 | Rossi | |
| 6,255,956 B1 | 7/2001 | Tingley et al. | |
| 6,808,201 B1 * | 10/2004 | Aoki | 280/735 |
| 6,812,844 B1 * | 11/2004 | Burgess | 340/573.1 |
| 6,922,147 B1 * | 7/2005 | Viksnins et al. | 340/573.1 |
| 6,922,154 B1 * | 7/2005 | Kraljic et al. | 340/687 |
| 6,924,742 B1 * | 8/2005 | Mesina | 340/573.1 |
| 6,930,614 B1 * | 8/2005 | Rackham et al. | 340/686.1 |

* cited by examiner

*Primary Examiner*—Daryl C Pope

(57) ABSTRACT

The infant alarm system for automobiles for alarming when the driver seat is unoccupied has a pressure sensor pad for detecting the presence of a person in a car seat. A belt buckle switch is for determining whether a belt buckle is buckled into an infant car seat. A control box is electrically connected to the pressure sensor pad and the belt buckle switch. The control box is for outputting an alarm signal when the belt buckle switch indicates that the belt buckle is buckled into the infant car seat and the pressure sensor pad does not detect the presence of the person in the car seat.

18 Claims, 2 Drawing Sheets

INFANT ALARM SYSTEM FOR AN AUTOMOBILE

BACKGROUND OF THE INVENTION

1. Field of the Invention

The present embodiment of the invention relates to a infant alarm system for automobiles for use in connection with alarms for automobiles. The infant alarm system for automobiles has particular utility in connection with alarm for detecting the presence of an infant in an infant seat when the driver seat is unoccupied.

2. Description of the Prior Art

Infant alarm system for automobiles are desirable for reminding drivers that a child has been left in an infant seat after the driver has exited the vehicle. Each year, many children fall victim to errors of forgetfulness on behalf of their guardian in leaving them in a vehicle unattended.

The use of alarms for automobiles is known in the prior art. For example, U.S. Pat. No. 5,949,340 to Rossi discloses a warning system for detecting presence of a child in an infant seat is provided for warning when a child has been left in an infant seat and a vehicle as been turned off. The apparatus includes an occupant detection mechanism for detecting the presence of an occupant within an infant seat located within a vehicle; an ignition detection mechanism for detecting the state of the vehicle's ignition system; a control unit for generating an alarm signal when the occupant detection mechanism detects the presence of an occupant within the infant seat and the ignition detection mechanism detects that the vehicle's ignition system has been turned from an "on" state to an "off" state; and an alarm units for generating an alarm in response to the alarm signal. The components of the apparatus can be located within the infant seat, within the vehicle or combined within the infant seat and the vehicle. However, the Rossi '340 patent does not have a pressure sensor responsive to the presence of an occupant in the driver's seat connected to a belt buckle sensor connected to the child safety seat.

Similarly, U.S. Pat. No. 5,793,291 to Thornton discloses a child alert system for automobiles, in one form, is an alarm system for detecting the presence of a person locked in a parked automobile. The alarm system includes a motion detector and a temperature detecting element coupled to a NOR gate. The motion detector transmits a low signal to the NOR gate once it detects motion within the interior of the automobile. The temperature detecting element transmits a low signal to the NOR gate if the temperature in the automobile exceeds a pre-determined extreme temperature. The NOR gate, upon receiving low signals from both the temperature detecting element and the motion detector, transmits an alarm signal. However, the Thornton '291 patent does not have a pressure sensor responsive to the presence of an occupant in the driver's seat connected to a belt buckle sensor connected to the child safety seat.

Further, U.S. Pat. No. 6,255,956 to Tingley et al. discloses a seat operated switch and warning system seat operated switch and warning system with an air cushion, an air tube leading from the air cushion to an air pressure switch, an electronic circuit to activate devices when a reduction in air pressure is sensed, a digital recordable message device, a radio frequency transmitting device, a housing to contain the pressure switch, digital message device and transmitting device, a matching radio frequency receiving device, and a portable housing to contain said receiving device said housing also containing an audio transducer that creates an audible warning sound activated by said receiving device. A preferred embodiment includes wherein when a person sits on said air cushion the pressure caused by the weight of the person causes said air pressure switch not to activate, but when said person exits off of said air cushion said air pressure switch causes said recorded message to play and causes said transmitter to send a signal to said receiver causing said audio transducer to produce a warning sound. However, the Tingley et al. '956 patent does not have a pressure sensor responsive to the presence of an occupant in the driver's seat connected to a belt buckle sensor connected to the child safety seat.

Yet further, U.S. Pat. No. 6,104,293 to Rossi discloses A warning system for detecting presence of a child in an infant seat is provided for warning when a child has been left in an infant seat and a vehicle as been turned off. The apparatus includes an occupant detection mechanism for detecting the presence of an occupant within an infant seat located within a vehicle; an ignition detection mechanism for detecting the state of the vehicle's ignition system; a control unit for generating an alarm signal when the occupant detection mechanism detects the presence of an occupant within the infant seat and the ignition detection mechanism detects that the vehicle's ignition system has been turned from an "on" state to an "off" state; and an alarm units for generating an alarm in response to the alarm signal. The components of the apparatus can be located within the infant seat, within the vehicle or combined within the infant seat and the vehicle. However, the Rossi '293 patent does not have a pressure sensor responsive to the presence of an occupant in the driver's seat connected to a belt buckle sensor connected to the child safety seat.

Further still, U.S. Pat. No. 5,901,978 to Breed et al. A method and apparatus for detecting the presence of a child seat on a seat in which information about contents of the seat is obtained and a signal is generated based on any contents of the seat, a different signal being generated for different contents of the seat when such contents are present on the seat. The signal is analyzed in order to determine whether the contents of the seat include a child seat, and in a preferred embodiment, a child seat in a rear-facing orientation. Another system within the vehicle may be affected or controlled based on the determination of whether a child seat is present on the seat. The analysis of the signal is preferably by pattern recognition techniques that can recognize and thus identify the contents of the seat. However, the Breed et al. '978 patent does not have a pressure sensor responsive to the presence of an occupant in the driver's seat connected to a belt buckle sensor connected to the child safety seat.

Lastly, U.S. Pat. No. 5,966,070 to Thornton discloses Child alert alarm for automobiles for detecting the presence of a child locked within a parked automobile during extreme temperatures. The alarm system includes a temperature detecting element and a child detecting element electrically coupled to an AND gate. The temperature detecting element transmits an extreme temperature signal to the AND gate if the temperature within the automobile exceeds a pre-selected maximum temperature. The child detecting element transmits a child detection signal to the AND gate when it detects a child within the automobile. The AND gate, upon receiving both the child detection signal and the extreme temperature signal, transmits and alarm signal. However, the Thornton '070 patent does not have a pressure sensor responsive to the presence of an occupant in the driver's seat connected to a belt buckle sensor connected to the child safety seat.

While the above-described devices fulfill their respective, particular objectives and requirements, the aforementioned patents do not describe a infant alarm system for automobiles that allows alarm for detecting the presence of an infant in an infant seat when the driver seat is unoccupied. The Rossi '340, Thornton '291, Tingley et al. '956, Rossi '293, Breed et al. '978 and Thornton '070 patents make no provision for a pressure sensor responsive to the presence of an occupant in the driver's seat connected to a belt buckle sensor connected to the child safety seat.

Therefore, a need exists for a new and improved infant alarm system for automobiles which can be used for alarm for detecting the presence of an infant in an infant seat when the driver seat is unoccupied. In this regard, the present embodiment of the invention substantially fulfills this need.

In this respect, the infant alarm system for automobiles according to the present embodiment of the invention substantially departs from the conventional concepts and designs of the prior art, and in doing so provides an apparatus primarily developed for the purpose of alarm for detecting the presence of an infant in an infant seat when the driver seat is unoccupied.

SUMMARY OF THE INVENTION

In view of the foregoing disadvantages inherent in the known types of alarms for automobiles now present in the prior art, the present embodiment of the invention provides an improved infant alarm system for automobiles, and overcomes the above-mentioned disadvantages and drawbacks of the prior art. As such, the general purpose of the present embodiment of the invention, which will be described subsequently in greater detail, is to provide a new and improved infant alarm system for automobiles and method which has all the advantages of the prior art mentioned heretofore and many novel features that result in a infant alarm system for automobiles which is not anticipated, rendered obvious, suggested, or even implied by the prior art, either alone or in any combination thereof.

To attain this, the present embodiment of the invention essentially comprises a pressure sensor pad for detecting the presence of a person in a car seat. A belt buckle switch is for determining whether a belt buckle is buckled into an infant car seat. A control box is electrically connected to the pressure sensor pad and the belt buckle switch. The control box is for outputting an alarm signal when the belt buckle switch indicates that the belt buckle is buckled into the infant car seat and the pressure sensor pad does not detect the presence of the person in the car seat.

There has thus been outlined, rather broadly, the more important features of the embodiment of the invention in order that the detailed description thereof that follows may be better understood and in order that the present contribution to the art may be better appreciated.

The present embodiment of the invention may also include an audible alarm speaker, a power switch and an electrical connector. There are, of course, additional features of the present embodiment of the invention that will be described hereinafter and which will form the subject matter of the claims attached.

Numerous objects, features and advantages of the present embodiment of the invention will be readily apparent to those of ordinary skill in the art upon a reading of the following detailed description of presently preferred, but nonetheless illustrative, embodiments of the present embodiment of the invention when taken in conjunction with the accompanying drawings. In this respect, before explaining the current embodiment of the embodiment of the invention in detail, it is to be understood that the embodiment of the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present embodiment of the invention.

It is therefore an object of the present embodiment of the invention to provide a new and improved infant alarm system for automobiles that has all of the advantages of the prior art alarms for automobiles and none of the disadvantages.

It is another object of the present embodiment of the invention to provide a new and improved infant alarm system for automobiles that may be easily and efficiently manufactured and marketed.

An even further object of the present embodiment of the invention is to provide a new and improved infant alarm system for automobiles that has a low cost of manufacture with regard to both materials and labor, and which accordingly is then susceptible of low prices of sale to the consuming public, thereby making such infant alarm system for automobiles economically available to the buying public.

Still another object of the present embodiment of the invention is to provide a new infant alarm system for automobiles that provides in the apparatuses and methods of the prior art some of the advantages thereof, while simultaneously overcoming some of the disadvantages normally associated therewith.

Lastly, it is an object of the present embodiment of the invention is to provide a infant alarm system for automobiles having a pressure sensor responsive to the presence of an occupant in the driver's seat connected to a belt buckle sensor connected to the child safety seat.

These together with other objects of the embodiment of the invention, along with the various features of novelty that characterize the embodiment of the invention, are pointed out with particularity in the claims annexed to and forming a part of this disclosure. For a better understanding of the embodiment of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The embodiment of the invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
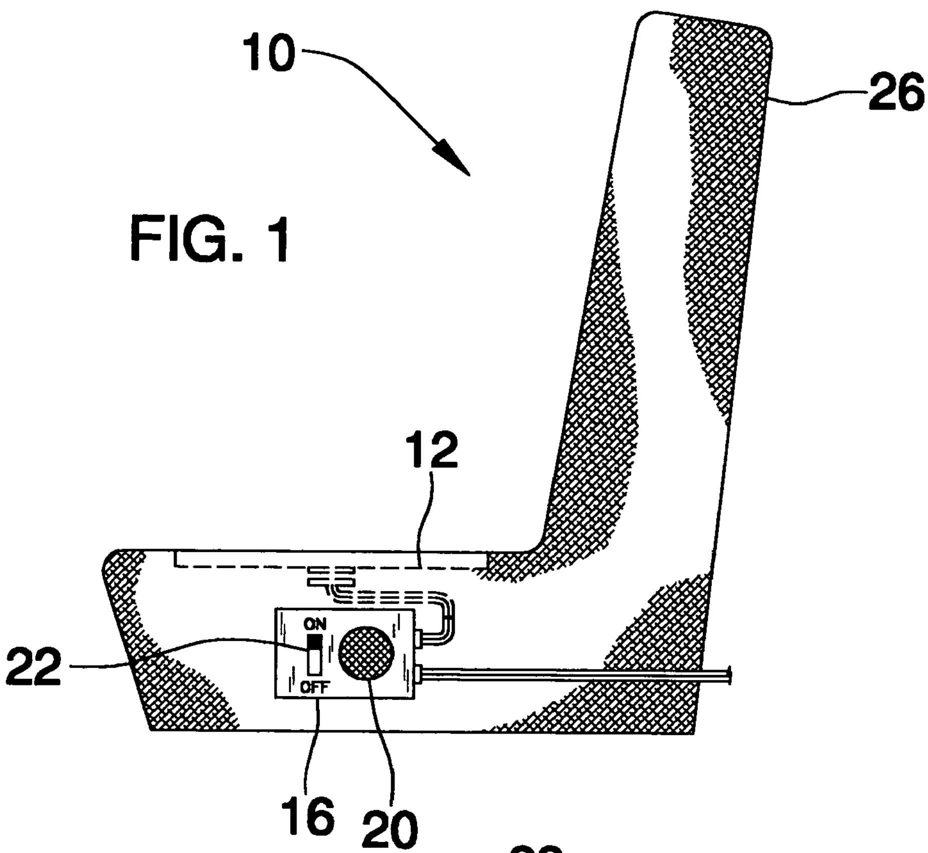
FIG. 1 is a left side view of the preferred embodiment of the infant alarm system for automobiles constructed in accordance with the principles of the present invention.
Figure 2:
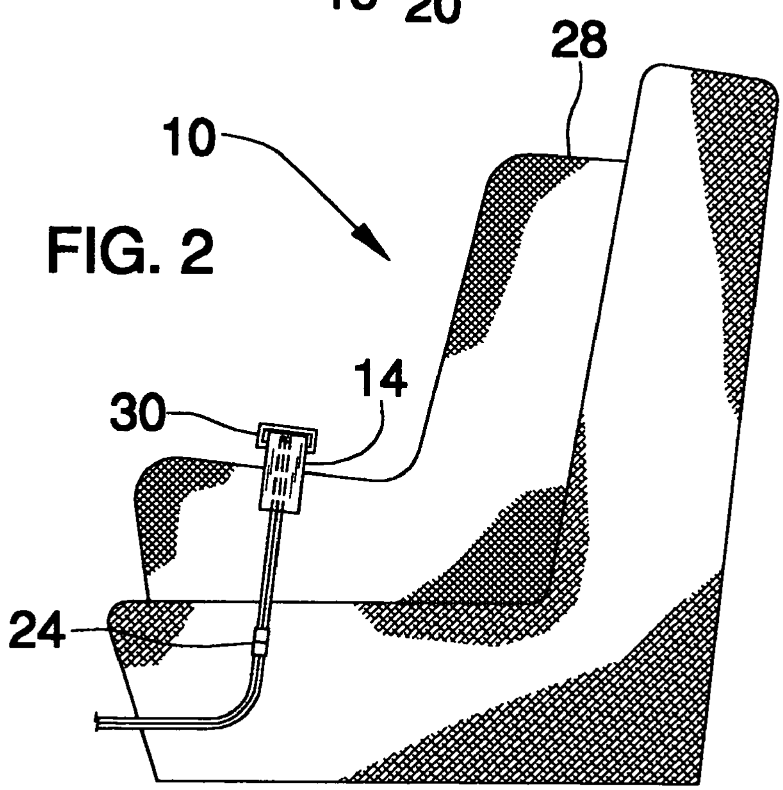
FIG. 2 is a left side view of the infant alarm system for automobiles of the present embodiment of the invention.
Figure 3:
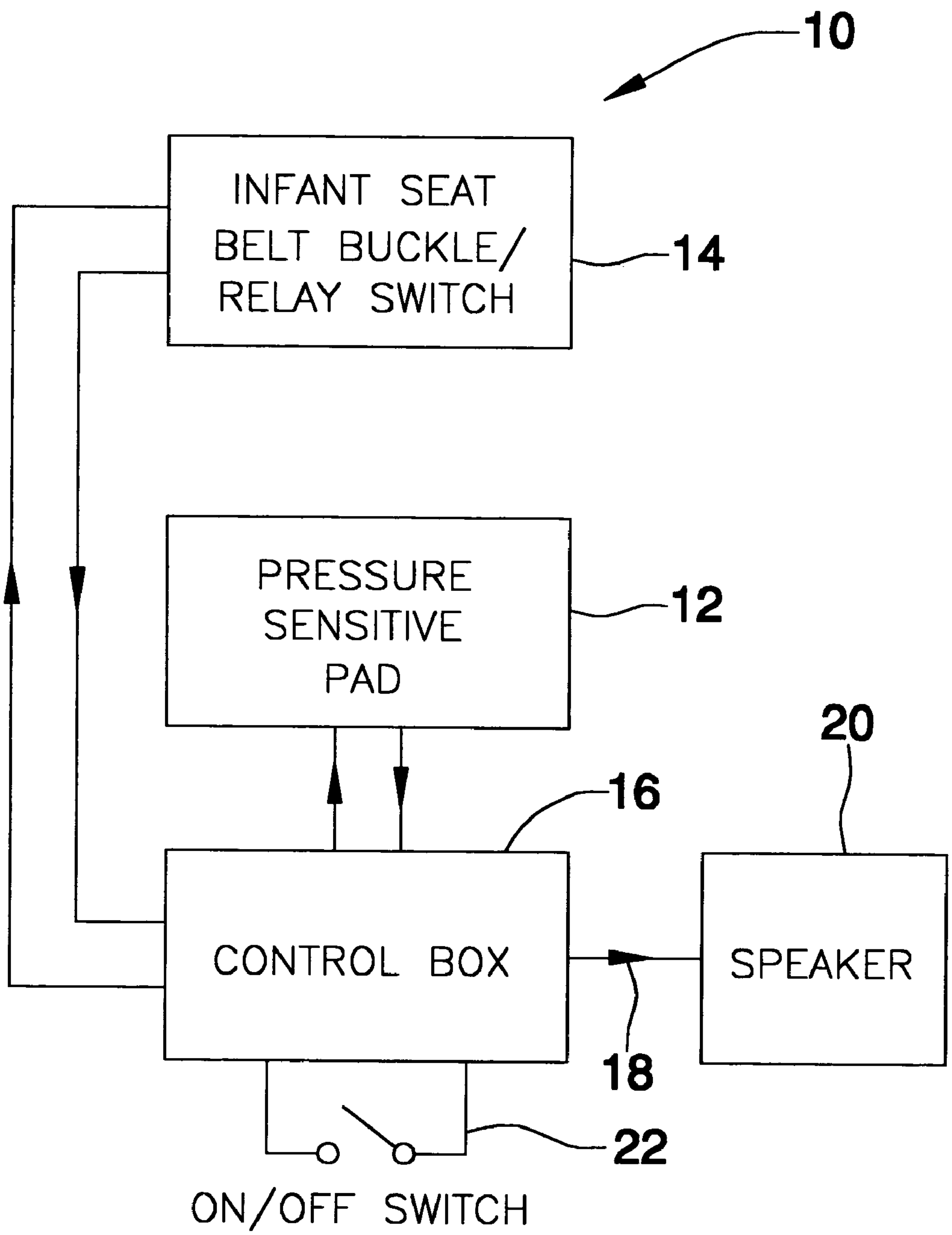
FIG. 3 is a wiring diagram view of the infant alarm system for automobiles of the present embodiment of the invention.

Referring now to the drawings, and particularly to FIGS. 1–3, a preferred embodiment of the infant alarm system for automobiles of the present invention is shown and generally designated by the reference numeral 10.

In FIG. 1, a new and improved infant alarm system for automobiles 10 of the present invention for alarm for detecting the presence of an infant in an infant seat when the driver seat is unoccupied is illustrated and will be described. More particularly, the infant alarm system for automobiles 10 has a pressure sensor pad 12 connectable to a conventional car seat 26. The pressure sensor pad 12 is for detecting the presence of the person in the conventional car seat 26. A control box 16 is electrically connected to the pressure sensor pad 12. An audible alarm speaker 20 is electrically connected to the control box 16 for emitting the audible alarm tone when the control box 16 outputs an alarm signal 18. A power switch 22 is electrically connected to the control box 16.

In FIG. 2, the infant alarm system for automobiles 10 is illustrated and will be described. More particularly, the infant alarm system for automobiles 10 a belt buckle switch 14 is connectable to a conventional infant car seat 28. The belt buckle switch 14 is for determining whether a conventional belt buckle 30 is buckled into the conventional infant car seat 28. The control box 16 (shown in FIG. 1) is electrically connected to the belt buckle switch 14. The control box 16 is for outputting the alarm signal 18 when the belt buckle switch 14 indicates that the conventional belt buckle 30 is buckled into the conventional infant car seat 28 and the pressure sensor pad 12 (shown in FIG. 1) does not detect the presence of the person in the conventional car seat 26. A electrical connector 24 is connected to the belt buckle switch 14.

In FIG. 3, the infant alarm system for automobiles 10 is illustrated and will be described. More particularly, the infant alarm system for automobiles 10 has the pressure sensor pad 12 connectable to the conventional car seat 26 (shown in FIG. 1). The pressure sensor pad 12 is for detecting the presence of the person in the conventional car seat 26. The pressure sensor pad can be a capacitive pressure sensor or an elastomer pressure sensor. The belt buckle switch 14 (shown in FIG. 2) is connectable to the conventional infant car seat 28 (shown in FIG. 2). The belt buckle switch 14 is for determining whether the conventional belt buckle 30 (shown in FIG. 2) is buckled into the conventional infant car seat 28. The belt buckle switch can be a microswitch, an optical switch or a proximity switch. The control box 16 is electrically connected to the pressure sensor pad 12. The control box 16 is electrically connected to the belt buckle switch 14. The control box 16 is for outputting the alarm signal 18 when the belt buckle switch 14 indicates that the conventional belt buckle 30 is buckled into the conventional infant car seat 28 and the pressure sensor pad 12 does not detect the presence of the person in the conventional car seat 26. The audible alarm speaker 20 is electrically connected to the control box 16 for emitting the audible alarm tone when the control box 16 outputs the alarm signal 18. The power switch 22 is electrically connected to the control box 16.

While a preferred embodiment of the infant alarm system for automobiles has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present embodiment of the invention. For example, any suitable occupant sensor may be used instead of the pressure sensor described. And although alarm for detecting the presence of an infant in an infant seat when the driver seat is unoccupied have been described, it should be appreciated that the infant alarm system for automobiles herein described is also suitable for warning of unattended cargo.

Therefore, the foregoing is considered as illustrative only of the principles of the embodiment of the invention. Further, since numerous modifications and changes will readily occur to those skilled in the art, it is not desired to limit the embodiment of the invention to the exact construction and operation shown and described, and accordingly, all suitable modifications and equivalents may be resorted to, falling within the scope of the embodiment of the invention.

I claim:

1. An infant alarm system for an automobile comprising:

a pressure sensor pad connectable to a conventional car seat, said pressure sensor pad for detecting the presence of a person in said conventional car seat;

a belt buckle switch connectable to a conventional infant car seat, said belt buckle switch for determining whether a conventional belt buckle is buckled into said conventional infant car seat; and a control box electrically connected to said pressure sensor pad, said control box electrically connected to said belt buckle switch, said control box for outputting an alarm signal when said belt buckle switch indicates that said conventional belt buckle is buckled into said conventional infant car seat and said pressure sensor pad does not detect the presence of said person in said conventional car seat.

2. The infant alarm system for an automobile of claim 1 further comprising:

an audible alarm speaker electrically connected to said control box for emitting an audible alarm tone when said control box outputs said alarm signal.

3. The infant alarm system for an automobile of claim 1 further comprising:

a power switch electrically connected to said control box.

4. The infant alarm system for an automobile of claim 1 further comprising:

an electrical connector connected to said belt buckle switch.

5. The infant alarm system for an automobile of claim 1 wherein:

said pressure sensor pad is a capacitive pressure sensor.

6. The infant alarm system for an automobile of claim 1 wherein:

said pressure sensor pad is an elastomer pressure sensor.

7. The infant alarm system for an automobile of claim 1 wherein:

said belt buckle switch is a microswitch.

8. The infant alarm system for an automobile of claim 1 wherein:

said belt buckle switch is an optical switch.

9. The infant alarm system for an automobile of claim 1 wherein:

said belt buckle switch is a proximity switch.

10. A infant alarm system for an automobile comprising:

a pressure sensor pad connectable to a conventional car seat, said pressure sensor pad for detecting the presence of a person in said conventional car seat;

a belt buckle switch connectable to a conventional infant car seat, said belt buckle switch for determining whether a conventional belt buckle is buckled into said conventional infant car seat;

a control box electrically connected to said pressure sensor pad, said control box electrically connected to said belt buckle switch, said control box for outputting an alarm signal when said belt buckle switch indicates that said conventional belt buckle is buckled into said conventional infant car seat and said pressure sensor pad does not detect the presence of said person in said conventional car seat; and an audible alarm speaker electrically connected to said control box for emitting an audible alarm tone when said control box outputs said alarm signal.

11. The infant alarm system for an automobile of claim 10 further comprising:

a power switch electrically connected to said control box.

12. The infant alarm system for an automobile of claim 11 further comprising:

an electrical connector connected to said belt buckle switch.

13. The infant alarm system for an automobile of claim 12 wherein:

said pressure sensor pad is a capacitive pressure sensor.

14. The infant alarm system for an automobile of claim 12 wherein:

said pressure sensor pad is an elastomer pressure sensor.

15. The infant alarm system for an automobile of claim 14 wherein:

said belt buckle switch is a microswitch.

16. The infant alarm system for an automobile of claim 14 wherein:

said belt buckle switch is an optical switch.

17. The infant alarm system for an automobile of claim 14 wherein:

said belt buckle switch is a proximity switch.

18. A infant alarm system for an automobile comprising:

a pressure sensor pad connectable to a conventional car seat, said pressure sensor pad for detecting the presence of a person in said conventional car seat;

a belt buckle switch connectable to a conventional infant car seat, said belt buckle switch for determining whether a conventional belt buckle is buckled into said conventional infant car seat;

a control box electrically connected to said pressure sensor pad, said control box electrically connected to said belt buckle switch, said control box for outputting an alarm signal when said belt buckle switch indicates that said conventional belt buckle is buckled into said conventional infant car seat and said pressure sensor pad does not detect the presence of said person in said conventional car seat;

an audible alarm speaker electrically connected to said control box for emitting an audible alarm tone when said control box outputs said alarm signal;

a power switch electrically connected to said control box; and an electrical connector connected to said belt buckle switch.

* * * * *